(12) United States Patent
Yoshida et al.

(10) Patent No.: US 10,899,308 B2
(45) Date of Patent: Jan. 26, 2021

(54) BAG BODY

(71) Applicant: Sumisho Airbag Systems Co., Ltd., Matsuura (JP)

(72) Inventors: Masatoshi Yoshida, Matsuura (JP); Teppei Harabayashi, Matsuura (JP)

(73) Assignee: SUMISHO AIRBAG SYSTEMS CO., LTD., Matsuura (JP)

( * ) Notice: Subject to any disclaimer, the term of this patent is extended or adjusted under 35 U.S.C. 154(b) by 180 days.

(21) Appl. No.: 15/999,819

(22) PCT Filed: Feb. 6, 2017

(86) PCT No.: PCT/JP2017/004205
§ 371 (c)(1),
(2) Date: Aug. 20, 2018

(87) PCT Pub. No.: WO2017/141751
PCT Pub. Date: Aug. 24, 2017

(65) Prior Publication Data
US 2020/0070766 A1    Mar. 5, 2020

(30) Foreign Application Priority Data

Feb. 19, 2016    (JP) .................................. 2016-030076

(51) Int. Cl.
*B60R 21/235*    (2006.01)
*B60R 21/2334*    (2011.01)
*D03D 1/02*    (2006.01)

(52) U.S. Cl.
CPC ........ *B60R 21/2334* (2013.01); *B60R 21/235* (2013.01); *D03D 1/02* (2013.01);
(Continued)

(58) Field of Classification Search
CPC . B60R 21/232; B60R 21/2334; B60R 21/235; B60R 21/2338;
(Continued)

(56) References Cited

U.S. PATENT DOCUMENTS 5,131,434 A * 7/1992 Krummheuer ........... D03D 1/02
139/35
6,296,276 B1    10/2001 Ritter
(Continued)

FOREIGN PATENT DOCUMENTS

CN    201062030 Y    5/2008
CN    104220658 A    12/2014
(Continued)

OTHER PUBLICATIONS

International Search Report (PCT/ISA/210) issued in PCT/JP2017/004205, dated Apr. 4, 2017.
(Continued)

*Primary Examiner* — Toan C To
(74) *Attorney, Agent, or Firm* — Birch, Stewart, Kolasch & Birch, LLP (57) ABSTRACT

Provided is a bag body which has a flatter shape in its expanded state. This bag body has control yarn therein, which controls expansion. The control yarn includes: a first seam which extends from a non-expansion section to another non-expansion section within the bag body; a second seam which is a seam forming the fabric on one surface of the expansion section of the bag body, and is formed by being separated from the fabric on said one surface, threaded through the first seam, and turned back to the fabric on said one surface; and a third seam which is a seam forming the fabric on the other surface of the expansion section of the bag body, and is formed by being separated from the fabric on the other surface, threaded through the first seam, and
(Continued)

(A)

(B)

turned back to the fabric on the other surface. A control seam group, which is configured from the first to third seams, includes: a first seam unit that is configured such that the two or more second seams alone are consecutively threaded through the first seam; and a second seam unit that is configured such that the two or more third seams alone are consecutively threaded through the first seam. The first and second seam units are alternately arranged in the direction in which the first seam extends.

8 Claims, 7 Drawing Sheets

(52) U.S. Cl.
CPC ............... *B60R 2021/23509* (2013.01); *B60R 2021/23542* (2013.01); *D10B 2505/124* (2013.01)

(58) Field of Classification Search
CPC  B60R 2021/23382; B60R 2021/23542; B60R 2021/23509; D03D 3/04; D03D 1/02; D03D 11/00; D10B 2505/124
USPC ............................................ 280/743.1, 743.2
See application file for complete search history.

(56) References Cited

U.S. PATENT DOCUMENTS

| | | | | |
|---|---|---|---|---|
| 8,622,421 B2* | 1/2014 | Obara | .................... | B60R 21/232 280/730.1 |
| 9,738,995 B2* | 8/2017 | Hirsch | ...................... | D03D 1/02 |
| 10,017,147 B2* | 7/2018 | Wootton | ............... | B60R 21/235 |
| 10,449,922 B2* | 10/2019 | Yoshida | ................. | B60R 21/233 |
| 2001/0042980 A1* | 11/2001 | Sollars, Jr. | ............. | B60R 21/235 280/743.1 |
| 2005/0161928 A1* | 7/2005 | Teramoto | .............. | B60R 21/235 280/743.1 |
| 2005/0253367 A1 | 11/2005 | Heigl | | |
| 2006/0128244 A1* | 6/2006 | Hill | ......................... | D03D 11/02 442/203 |
| 2009/0224521 A1* | 9/2009 | Huber | ................... | D03D 13/008 280/743.1 |
| 2013/0113195 A1* | 5/2013 | Finn | ....................... | B60R 21/235 280/743.2 |
| 2013/0187368 A1* | 7/2013 | Donais | ................... | B60R 21/231 280/743.1 |
| 2015/0151710 A1 | 6/2015 | Tanaka et al. | | |
| 2016/0368448 A1 | 12/2016 | Yoshida et al. | | |

FOREIGN PATENT DOCUMENTS

| | | |
|---|---|---|
| DE | 3903216 A1 | 8/1990 |
| EP | 0190039 A2 | 8/1986 |
| FR | 2.063.535 A5 | 7/1971 |
| JP | 2005-324788 A | 11/2005 |
| JP | 4763121 B2 | 8/2011 |
| JP | 2013-224089 A | 10/2013 |
| WO | WO 2013/159909 A1 | 10/2013 |
| WO | WO 2015/005308 A1 | 1/2015 |

OTHER PUBLICATIONS

Extended European Search Report for European Application No. 17753009.4, dated May 31, 2019.

Chinese Office Acton and Search Report dated Jul. 31, 2020 for Application No. 201780011545.4.

* cited by examiner

BAG BODY

TECHNICAL FIELD

The present invention relates to a bag body having therein restriction yarns for restricting inflation. More specifically, the present invention relates to an airbag for an automobile.

BACKGROUND ART

The safety for automobiles has been demanded more than ever before. At the same time, the inside of the automobile is demanded to be wide and comfortable. Therefore, not only the compactness of the mounted airbag is required, but also the inflator that generates the deployed gas tends to be miniaturized. Therefore, an airbag that exhibits sufficient performance even with a small amount of gas has become necessary.

Patent Literature 1 discloses an airbag provided with a spacer formed by warp and/or weft which controls an inflation distance of an inflating section when the airbag inflates. Patent Literature 1 discloses a method of defining an airbag thickness in an inflated state by using a weaving yarn without bonding an inner base fabric. However, according to Patent Literature 1, since the thickness of the inflated state is limited only by the length of the yarn having passed as the spacer, there is a drawback that it is difficult to balance the control of the inflated shape and the thickness.

In addition, Patent Literature 2 discloses a bag body using a yarn which extends from a non-inflating section to another non-inflating section and does not form a base fabric and a restriction yarn which constitutes the base fabric intersecting with the yarn. It is disclosed in the specification that the thickness and volume can be adjusted by controlling the length of the restriction yarns and the organizing method of the yarn, but when the drawings and the specification are viewed, the thickness of the inflated state is controlled only by the length of the restriction yarn constituting the base fabric, and similarly to Patent Literature 1, it is difficult to balance the control of the inflated shape and the thickness.

CITATION LIST

Patent Literature

PATENT LITERATURE 1: JP-B-4763121
PATENT LITERATURE 2: JP-A-2013-224089

SUMMARY OF INVENTION

Technical Problem

The present invention provides a bag body having a restriction yarn which restricts inflation of an inflating section integrally formed by hollow weaving, capable of widening a region for protecting an occupant while reducing the amount of gas of an inflator by restricting excessive inflation of the inflating section by the restriction yarn when the bag body is deployed. In addition, the present invention provides a versatile airbag that controls the shape of the inflated state of the airbag by the restriction yarn to make the thickness of the airbag uniform throughout, thereby not depending on different structural shapes for each vehicle.

Solution to Problem

In order to solve the problem, the present invention is a bag body having therein restriction yarns for restricting inflation, wherein the restriction yarns comprises:

a first yarn (11, 31) extending inside the bag body from a non-inflating section to another non-inflating section;

a second yarn (12, 32) forming a base fabric on one side of an inflating section of the bag body, the second yarn (12, 32) leaving the base fabric on the one side, being caught on the first yarn (11, 31) or constituting a weaving structure with the first yarn (11, 31), and returning to the base fabric on the one side and being woven into the base fabric; and a third yarn (13, 33) forming a base fabric on the other side of the inflating section of the bag body, the third yarn (13, 33) leaving the base fabric on the other side, being caught on the first yarn (11, 31) or constituting a weaving structure with the first yarn (11, 31), and returning to the base fabric on the other side and being woven into the base fabric, wherein a first restriction yarn group (21) is constituted by the first yarn (11, 31), the second yarn (12, 32), and the third yarn (13, 33), and the first restriction yarn group (21) comprises a first yarn unit (22) that is configured such that two or more second yarns (12, 32) alone are consecutively caught on the first yarn (11, 31) or constitute a weaving structure with the first yarn (11, 31), and a second yarn unit (23) that is configured such that two or more third yarns (13, 33) alone are consecutively caught on the first yarn (11, 31) or constitute a weaving structure with the first yarn (11, 31), and the first yarn unit (22) and the second yarn unit (23) are arranged alternately in an extending direction of the first yarn (11, 31).

In addition, according to another aspect of the present invention, the lengths of the second yarn and the third yarn constituting each yarn unit are different according to each yarn unit.

In addition, according to another aspect of the present invention, in the lengths of the second yarn and the third yarn constituting each yarn unit, the length of the yarn arranged on the outside in each of the yarn units with respect to the extending direction of the first yarn is longer than the length of the yarn arranged on the inside.

In addition, according to another aspect of the present invention, a plurality of first restriction yarn groups are arranged side by side.

In addition, according to another aspect of the present invention, the restriction yarns further comprises:

a fourth yarn (34) extending inside the bag body from the non-inflating section to another non-inflating section and extending parallel to the first yarn (31);

a fifth yarn (35) forming the base fabric on the other side of the inflating section of the bag body, the fifth yarn (35) leaving the base fabric on the other side while being opposite to the second yarn (32), being caught on the fourth yarn (34) or constituting a weaving structure with the fourth yarn (34), and returning to the base fabric on the other side and being woven into the base fabric; and a sixth yarn (36) forming the base fabric on one side of the inflating section of the bag body, the sixth yarn (36) leaving the base fabric on the one side while being opposite to the third yarn (33), being caught on the fourth yarn (34) or constituting a weaving structure with the fourth yarn (34), and returning to the base fabric on the one side and being woven into the base fabric, a second restriction yarn group (41) is constituted by the fourth yarn (34), the fifth yarn (35), and the sixth yarn (36), and the second restriction yarn group (41) comprises a third yarn unit that is configured such that two or more fifth yarns (35) alone are consecutively caught on the fourth yarn (34)

or constitute a weaving structure with the fourth yarn (34), and a fourth yarn unit that is configured such that two or more sixth yarns (36) alone are consecutively caught on the fourth yarn (34) or constitute a weaving structure with the fourth yarn (34), and the third yarn unit and the fourth yarn unit are arranged alternately in an extending direction of the fourth yarn (34).

In addition, according to another aspect of the present invention, the lengths of the fifth yarn and the sixth yarn constituting each yarn unit are different according to each yarn unit.

In addition, according to another aspect of the present invention, in the lengths of the fifth yarn and the sixth yarn constituting each yarn unit, the length of the yarn arranged on the outside in each of the yarn units with respect to the extending direction of the fourth yarn is longer than the length of the yarn arranged on the inside.

In addition, according to another aspect of the present invention, a plurality of second restriction yarn groups are arranged side by side.

In addition, according to the present invention, it is possible to more flexibly control the thickness of the inflated state of the airbag by effectively arranging the restriction yarn, the stress applied to the restriction yarn is made uniform by the function of the restriction yarn extending from the non-inflating section to another non-inflating section even in the airbag regions having different thicknesses, and it is possible to expected to suppress the rupture of the restriction yarn at high pressure.

DESCRIPTION OF EMBODIMENTS

Figure 1:
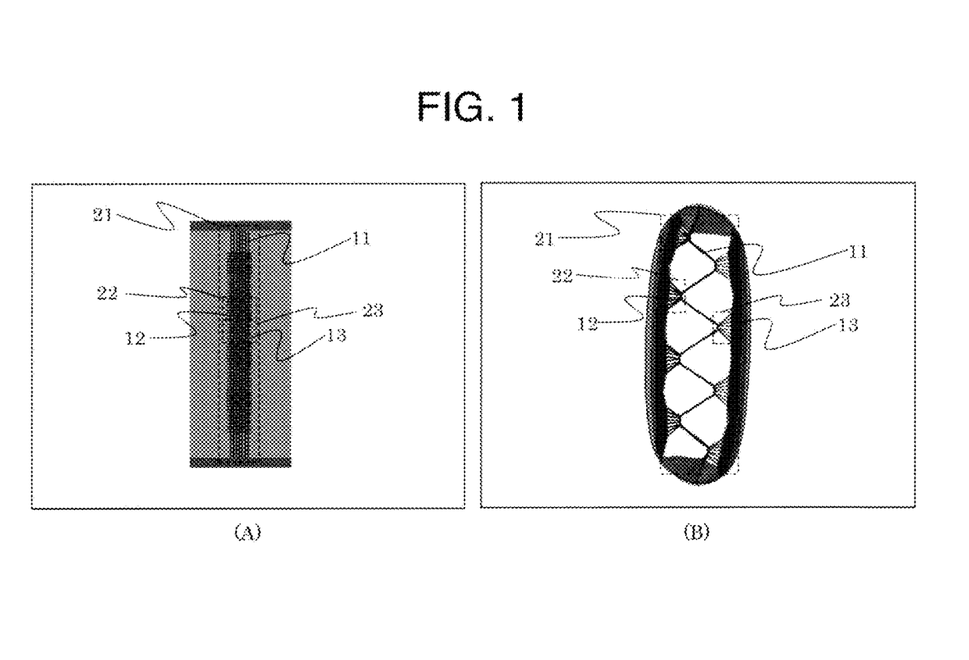
FIG. 1 is a diagram illustrating an arrangement example of a restriction yarn of the present invention. (A) illustrates a state of a restriction yarn before a bag body inflates. (B) illustrates a state of a restriction yarn in an inflated state of a bag body.

FIG. 1 is a diagram illustrating an arrangement example of a restriction yarn of the present invention, wherein (A) illustrates a state of a restriction yarn before inflation, and (B) illustrates a state of a restriction yarn in an inflated state. The bag body includes: a first yarn 11 extending inside the bag body from a non-inflating section to another non-inflating section; a second yarn 12 forming a base fabric on one side of an inflating section of the bag body, the second yarn 12 leaving the base fabric on the one side, being caught on the first yarn, and returning to the base fabric on the one side and being woven into the base fabric; and a third yarn 13 forming the base fabric on the other side of the inflating section of the bag body, the third yarn 13 leaving the base fabric on the other side, being caught on the first yarn, and returning to the base fabric on the other side and being woven into the base fabric. A first restriction yarn group 21 is constituted by the first yarn 11, the second yarn, and the third yarn. The first restriction yarn group 21 includes a first yarn unit 22 that is configured such that two or more second yarns 12 alone are consecutively caught on the first yarn 11 or constitute a weaving structure with the first yarn 11, and a second yarn unit 23 that is configured such that two or more third yarns 13 alone are consecutively caught on the first yarn 11 or constitute a weaving structure with the first yarn 11. The first yarn unit 22 and the second yarn unit 23 are alternately arranged in the extending direction of the first yarn 11.

The principle of restricting the thickness in the inflated state of the bag body according to the present invention will be described with reference of FIG. 1.

When the bag body inflates, the first yarn 11 that extends from the non-inflating section to the non-inflating section is temporarily loosened since the distance between the non-inflating sections decreases. However, since the first yarn 11 is caught on both the second yarn 12 that forms one base fabric and the third yarn 13 that forms the other base fabric, the first yarn 11 would be pulled by both yarns, thereby forming a wavy line shape within the bag body. The number of mountains of the first yarn 11 forming the wavy line shape is (N+M), where the number of units of the first yarn unit 22 in which the second yarns 12 alone is consecutively formed is N, and the number of units of the second yarn unit 23 formed by the third yarn 13 is M. As the number (N+M) of mountains of the wavy line shape decreases, the length of one section of the wavy line shape becomes longer and the inflation thickness of the bag body becomes thicker. Conversely, as (N+M) increases, i.e. the number of mountains increases, the length of one section of the wavy line shape becomes shorter and the inflation thickness becomes thinner.

When one section of the wavy line shape is shorter than 10 mm, the distance between the second yarn and the third yarn becomes short, and the thickness of the bag body is substantially defined by the lengths of the second yarn 12 and the third yarn 13. Therefore, it is preferable that a relationship between the sum (N+M) of the numbers of units of the first and second yarn units and the length (L) mm of the first yarn 11 satisfies the following formula.

$$(N+M) \leq (L/10)$$

In addition, the thickness of the inflated state can be adjusted by changing not only the total number of units of the first and second yarn units but also the length of each of the second yarn 12 and the third yarn 13.

Furthermore, there are some parameters for controlling the thickness and the inflated shape, such as the width of the first and second yarn units, the number of yarns constituting the yarn unit, the distance therebetween, and the distance to the second yarn 12 and the third yarn 13 which are located closest when viewed from the end section of the first yarn 11, in addition to the number of the first and second yarn units described above or the lengths of the second yarn 12 and the third yarn 13. By appropriately combining them, it is possible to obtain a desired thickness and shape in the inflated state of the bag body.

The number of restriction yarns constituting each of the yarn units 22 and 23 may be consecutively two or more, and although not particularly limited, may be preferably five or more, and more preferably 10 or more when considering a small stress applied to the base fabric and each restriction yarn, the internal pressure retention, as well as the breakage resistance of the restriction yarn.

In addition, concerning the interval at which the restriction yarns constituting each yarn unit are arranged, it is preferable that about one yarn exists for the width of 1 mm to 5 mm with respect to the base fabric of one side, and it is more preferable that about one yarn exists for the width of 2 mm to 3 mm. When the interval at which the restriction yarns are arranged is narrow, the number of restriction yarns relatively decreases and the restriction yarn cannot withstand the pressure at the time of airbag deployment and is easily broken.

The length of the restriction yarn constituting the base fabric of the bag section is not particularly limited, but is preferably about 10 mm to 200 mm when used as an airbag base fabric, and more preferably about 20 mm to 150 mm. When the length of the restriction yarn constituting the base fabric is short, the number of restriction yarns extending from the non-inflating section to the non-inflating section is limited, and the strength of the entire restriction yarn decreases. Conversely, when the length of the restriction yarn is too long, tension is not applied to the restriction yarn extending from the non-inflating section to the non-inflating section, and the thickness may not be limited.

The number of the first yarns 11 in one restriction yarn group is preferably 5 or more, and more preferably 10 or more. When the number of the first yarns 11 is 5 or less, the first yarn 11 may not withstand the stress in the inflated state and breakage may occur.

Concerning the first yarn 11 and the second yarn 12, and the first yarn 11 and the third yarn 13, substantially the same inflated shape can be obtained whichever when the restriction yarns are caught on each other, or when the weaving structure is constituted by the restriction yarns.

Figure 2:
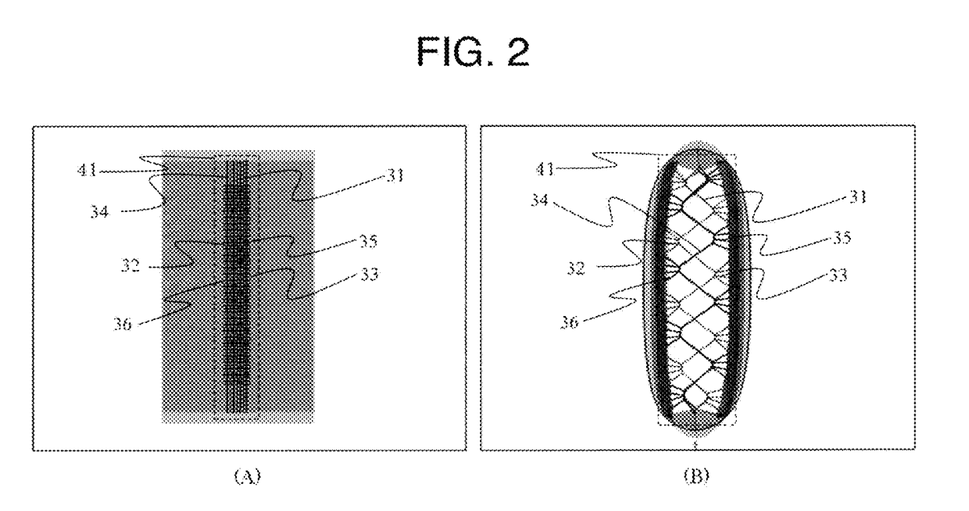
FIG. 2 is a diagram illustrating an arrangement example of a restriction yarn of the present invention, illustrating an arrangement pattern of a restriction yarn of a bag body having a fourth yarn extending parallel to a first yarn. (A) illustrates a state of a restriction yarn before a bag body inflates. (B) illustrates a state of a restriction yarn in an inflated state of a bag body.

In addition, in the example of the bag body illustrated in FIG. 2, the restriction yarns includes: a fourth yarn 34 extending inside the bag body from the non-inflating section to another non-inflating section and extending parallel to the first yarn 31; a fifth yarn 35 forming the base fabric on the other side of the inflating section of the bag body, the fifth yarn 35 leaving the base fabric on the other side while being opposite to the second yarn 32, being caught on the fourth yarn 34 or constituting a weaving structure with the fourth yarn 34, and returning to the base fabric on the other side and being woven into the base fabric; and a sixth yarn 36 forming the base fabric on one side of the inflating section of the bag body, the sixth yarn 36 leaving the base fabric on the one side while being opposite to the third yarn 33, being caught on the fourth yarn 34 or constituting a weaving structure with the fourth yarn 34, and returning to the base fabric on the one side and being woven into the base fabric. A second restriction yarn group 41 is constituted by the fourth yarn 34, the fifth yarn 35, and the sixth yarn 36. The second restriction yarn group 41 includes a third yarn unit that is configured such that two or more fifth yarns 35 alone are consecutively caught on the fourth yarn 34 or constitute a weaving structure with the fourth yarn 34, and a fourth yarn unit that is configured such that two or more sixth yarns 36 alone are consecutively caught on the fourth yarn 34 or constitute a weaving structure with the fourth yarn 34. The third yarn unit and the fourth yarn unit are alternately arranged in the extending direction of the fourth yarn 34. With this structure, it is possible to further disperse the stress applied to the restriction yarns constituting the base fabric and the base fabric surface, and it is possible to suppress breakage of the restriction yarns at high pressure.

Figure 3:
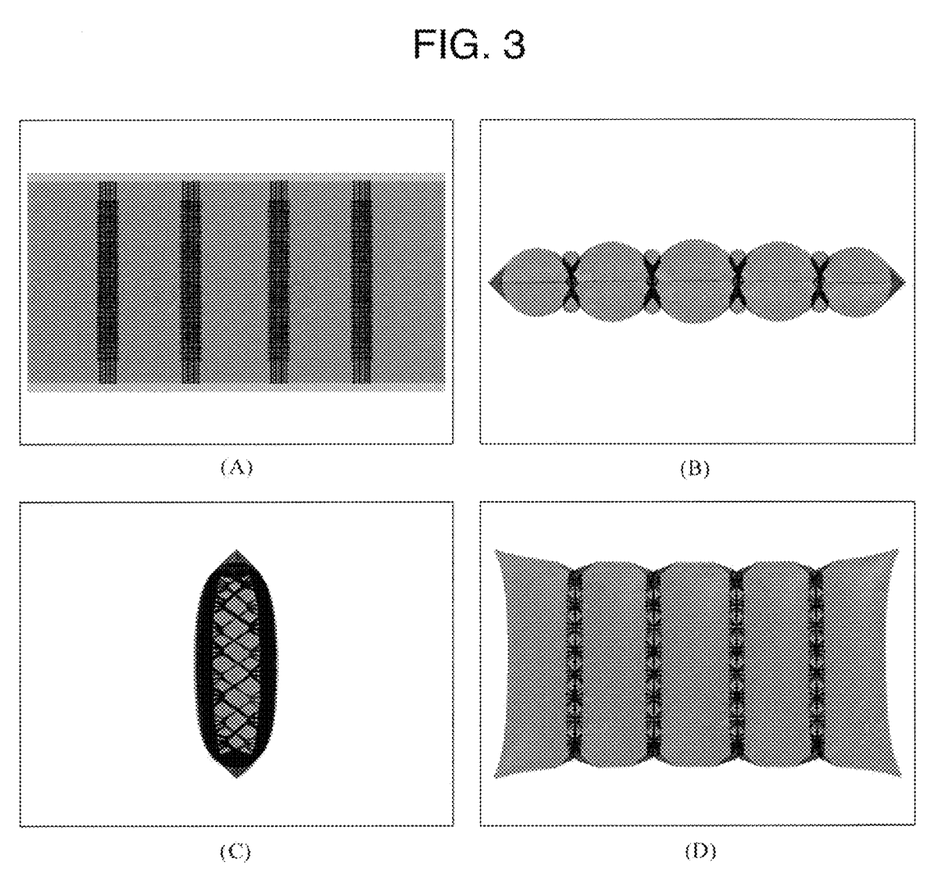
FIG. 3 illustrates a state in which a restriction yarn of the present invention is arranged in parallel within a bag body. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

FIG. 3 illustrates a diagram when the restriction yarns illustrated in FIG. 2 are arranged in parallel within the bag body. (A) illustrates a state before inflation, (B) illustrates a bottom view of the inflated state, (C) illustrates a side surface of the inflated state, and (D) illustrates a front view of the inflated state. Thus, by arranging the restriction yarns of the present invention in parallel, it is possible to form the bag body having an approximately uniform thickness as a whole in the inflated state.

Figure 4:
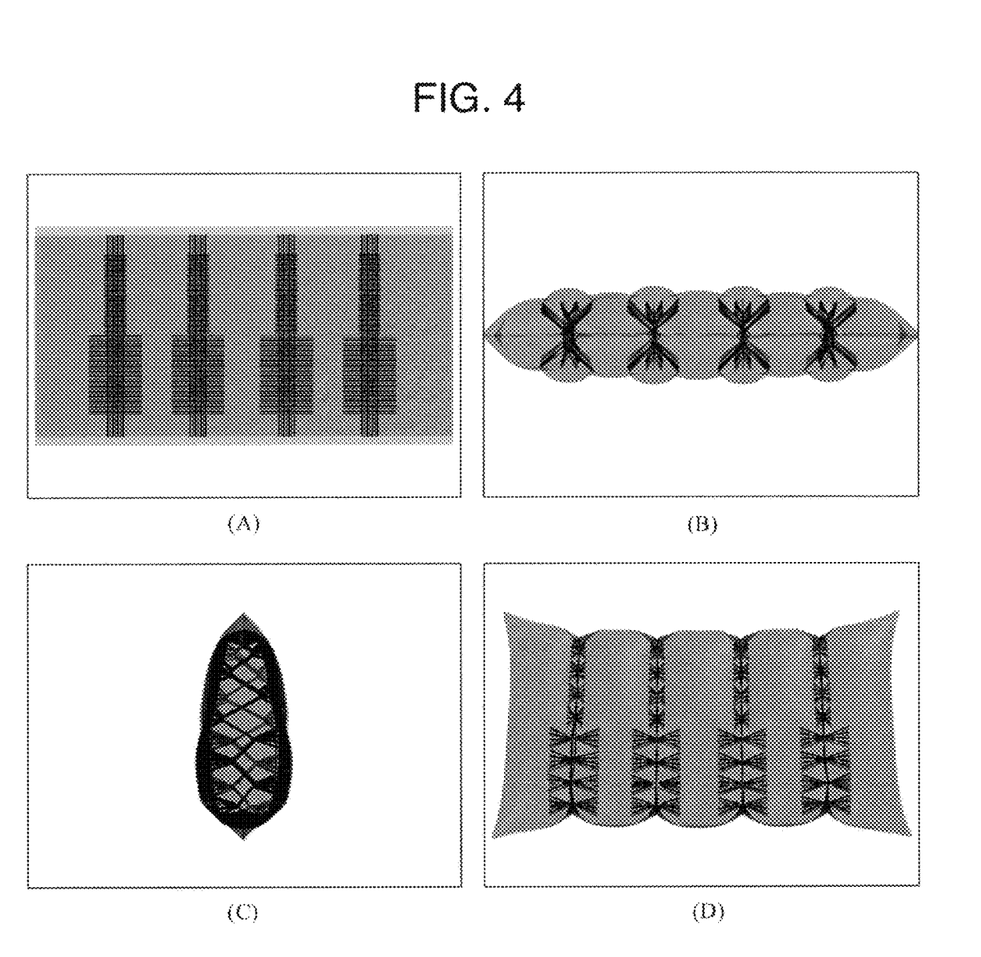
FIG. 4 is an example of the present invention having a restriction yarn having different lengths according to a yarn unit. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

The length of the restriction yarn constituting the yarn unit may be different according to each yarn unit so as to obtain a desired thickness and inflated shape as illustrated in FIG. 4. In FIG. 4, (A) illustrates a state before inflation, (B) illustrates a bottom view of the inflated state, (C) illustrates a side surface of the inflated state, and (D) illustrates a front view of the inflated state. As described above, even when the restriction yarns have different lengths for each yarn unit, the stress applied to each yarn unit is made uniform by the actions of the first yarn and the fourth yarn, and the stress concentration on a specific yarn unit can be avoided.

Figure 5:
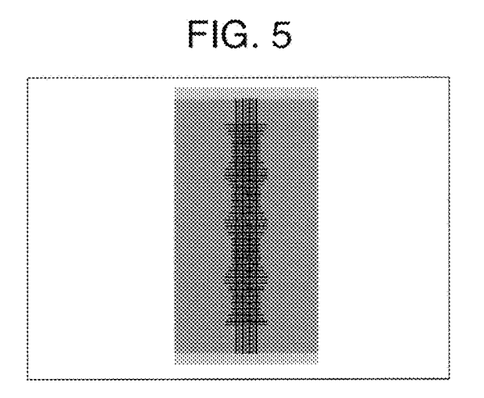
FIG. 5 is an example in which a length of a restriction yarn outside a yarn constituting a yarn unit is longer than a length of an inner side, according to the present invention.

In addition, in order to further distribute the stress applied to the base fabric and the restriction yarn, it is preferable to set the length of the outer yarn of the yarn constituting the yarn unit to be longer than the length of the inner yarn as illustrated in FIG. 5.

Although the weaving density of the bag body is not particularly limited, it is preferable to use a weaving density higher than the number of the restriction yarns so as to provide airtightness for the portion where the restriction yarns exist.

Regarding the fineness of the restriction yarn in the present invention, a yarn is usually used which has a yarn fineness equivalent to that of the yarn constituting the base fabric. However, in particular, when it is desired to suppress breakage of the restriction yarn, the fineness of the restriction yarn may be increased. When the fineness of the restriction yarn is increased, it is preferably 20% to 60% larger than that of the base fabric yarn forming the base fabric, and more preferably 30% to 50% larger than that of the base fabric yarn forming the base fabric. If the above value is less than 20%, the effect of suppressing breakage cannot be sufficiently obtained. If the above value exceeds 60%, it becomes difficult to uniformly weave the base fabric at the time of weaving. Therefore, coating unevenness may occur during coating of a coating agent such as a silicone resin, and the airtightness of the airbag may be impaired. In addition, a fiber yarn bundled with two or more yarns having fineness equal to or smaller than that of the base fabric yarn and made thicker than the base fabric yarn may be used as the restriction yarn.

The fineness of weft and warp of the base fabric used in the present invention is usually selected by a yarn having a thickness used for the base fabric for the airbag, that is, in the range of 150 dtex to 1,000 dtex, and preferably in the range of 235 dtex to 700 dtex. When the fineness is less than 150 dtex, the strength required for the airbag tends to be difficult to obtain, and when the fitness exceeds 1,000 dtex, the basis weight tends to become too large.

The strength of the yarn used in the present invention may be 7 cN/dtex or more, and preferably 8 cN/dtex or more. In addition, the single yarn thickness of the yarn is preferably, for example, in the range of 0.5 dtex to 6 dtex. Furthermore, the cross-sectional shape of the single yarn may be appropriately selected within the range that does not interfere with the production of the base fabric and the physical properties of the base fabric. For example, the cross-sectional shape of the single yarn may be round, oval, flat, polygonal, hollow, and other different shapes. In addition, a plurality of yarns having different fineness, cross-sectional shapes, or the like may be integrated by spinning, twisting, or the like.

The base fabric used in the present invention preferably has a basis weight of 260 g/m2 or less and a tensile strength of 650 N/cm or more. If the basis weight and the tensile strength are within this range, it can be said that it is light and excellent in physical properties. The term "basis weight" refers to the weight of the base fabric in an unprocessed state before application of an air-impermeable material or the like, which will be described later.

When the basis weight exceeds 260 g/m2, the weight of the airbag increases, making it difficult to attain the desired weight reduction. In addition, when the tensile strength is less than 650 N/cm, there is a possibility that necessary physical properties as the airbag cannot be achieved.

In addition, the base fabric used in the present invention preferably has a cover factor of 700 or more, and more preferably 750 or more. The cover factor is an index indicating the compactness of the weaving structure.

The cover factor (CF) is generally obtained by multiplying the weaving density N (piece/cm) and the thickness D (dtex) of warp and weft of the base fabric, and is expressed by the following formula.

$$CF = N_w \times \sqrt{D_w} + N_f \times \sqrt{D_f}$$

Here, Nw and Nf are the weaving densities of warp and weft (piece/cm).

Dw and Df are the thicknesses of warp and weft (dtex).

The hollow weave of the present invention can be produced by a loom with a jacquard device. A weft insertion method may be appropriately selected from various looms used for weaving ordinary industrial base fabrics, and for example, may be selected from a shuttle loom, a water jet loom, an air jet loom, a rapier loom, a projectile loom, and the like.

In addition, the fiber yarn constituting the base fabric for the airbag of the present invention may be a natural fiber, a chemical fiber, an inorganic fiber, and the like, and is not particularly limited. Among them, there is general versatility, and synthetic fiber filaments are preferable from the viewpoint of the manufacturing process of the base fabric, the physical properties of the base fabric, and the like. For example, one type or two or more types may be appropriately selected from nylon 6, nylon 66, nylon 46, nylon 610, nylon 612, and the like alone or in combination, an aliphatic polyamide fiber obtained by mixing, copolymerized polyamide fiber of aliphatic amine and aromatic carboxylic acid represented by nylon 6T, nylon 6I, and nylon 9T, polyethylene terephthalate, polytrimethylene terephthalate, polybutylene terephthalate, polyethylene naphthalate, and the like, or copolymerization thereof, polyester fiber obtained by mixing, ultra-high molecular weight polyolefin fiber, chlorinated fibers such as vinylidene and polyvinyl chloride, fluorine-based fiber containing polytetrafluoroethylene, polyacetal fiber, polysulfone fiber, polyphenylene sulfide fiber (PPS), polyetheretherketone fiber (PEEK), wholly aromatic polyamide fiber, wholly aromatic polyester fiber, polyimide fiber, polyetherimide fiber, polyparaphenylene benzbisoxazole type fiber (PBO), vinylon fiber, acrylic fiber, cellulose fiber, silicon carbide fiber, alumina fiber, glass fiber, carbon fiber, steel fiber, and the like. Among them, nylon 66 fiber and polyester fiber are preferable from the viewpoints of physical properties, durability, heat resistance, and the like. From the viewpoint of recycling, polyester fiber and nylon 6 fiber are also preferable.

In these fiber yarns, in order to improve spinnability, processability, durability, and the like, one type or two or more types among various commonly used additives, for example, a heat stabilizer, an antioxidant, a light stabilizer, an antioxidant, a lubricant, a smoothing agent, a pigment, a water repellent, an oil repellent, and a titanium oxide may be used. In addition, processing such as twisting, bulking processing, crimping processing, winding processing, gluing processing, or the like may be performed. Furthermore, as the form of the yarn, besides long fiber filaments, short fiber spun yarns, composite yarns thereof, or the like may be used.

In addition, the base fabric used in the present invention preferably has an air-impermeable material in that airtightness of the airbag can be secured. The air-impermeable material is a material which makes substantially air impermeable, for example, as illustrated below, and the term "air-impermeable" means a zero measured value in 8.27.1 A Method (Frazier type method) in JIS L1096 "textile and knitted base fabric test method". This material is applied from one side or both sides of the base fabric by the method described later. The air-impermeable material may be interposed either on the surface of the base fabric, at the intersection of the yarn bundle constituting the base fabric, or at the gap of the single fiber yarn.

As the material, any material may be usually used as long as the material is used for the airbag base fabric, and any material may be used as long as the material satisfies heat resistance, abrasion resistance, adhesion to the base fabric, flame retardancy, non-adherence, and the like. For example, one type or two or more types among silicone resin or rubber, polyurethane resin or rubber (including silicone modification and fluorine modification), fluororesin or rubber, chlorine type resin or rubber, polyester resin or rubber, polyamide resin or rubber, epoxy resin, vinyl resin, urea-based resin, phenolic resin, olefinic resin, and the like may be used. Among them, silicone resin, polyamide resin, polyester resin, polyurethane resin, or the like is preferable from the viewpoint of heat resistance and flame retardancy.

The applying method may be 1) a coating method (knife, kiss, reverse, comma, slot die, and lip, etc.), 2) an immersion method, 3) a printing method (screen, roll, rotary and gravure, etc.), 4) a transfer method, 5) a lamination method, and combinations thereof. Among them, the coating method or the lamination method is preferable from the viewpoint that the effect of maintaining the internal pressure is high.

The amount to be applied is preferably from 10 g/m² to 150 g/m² on one side, and more preferably from 50 g/m² to 100 g/m². In addition, in the case of a layered structure, the thickness thereof is preferably 10 μm or more. If the applied amount is less than 10 g/m² on one side or the thickness of the layer is less than 10 μm, it is difficult to obtain necessary airtightness.

In addition, for the material, besides the main material, in order to improve processability, adhesiveness, surface characteristics, or durability, one type or two or more types among various commonly used additives, for example, a crosslinking agent, an adhesion promoter, a reaction accelerator, a reaction retarder, a heat stabilizer, an antioxidant, a light stabilizer, an antioxidant, a lubricant, a smoothing agent, an anti-blocking agent, a pigment, a water repellent, an oil repellent, a concealing agent such as titanium oxide, a gloss providing agent, a flame retardants, and a plasticizer may be selected and mixed.

The properties of the material as the solution may be appropriately selected from a solventless type, a solvent type, an aqueous dispersion type, a water emulsion type, a water soluble type, and the like according to a coating amount, a coating method, processability and stability of the material, required properties, and the like.

In addition, various pre-processing agents, adhesion improvers, and the like for improving the adhesion to the base fabric may be added to the material, and pre-processing such as primer treatment may be applied to the surface of the base fabric in advance. Furthermore, in order to improve the physical properties of the material and impart heat resistance, aging resistance, oxidation resistance, and the like, drying, crosslinking, heat treatment such as vulcanization, pressurized heat treatment, high energy treatment (high frequency, electron beam, ultraviolet ray etc.), or the like may be performed after the material is applied to the base fabric.

In the case of performing lamination processing, the material to be laminated is not particularly limited, and known materials such as homopolymer or copolymer such as polyester resins, polyamide resins, polyolefin resins, and polyurethane resins, copolymer and modified product with other materials, and the like can be used. In addition, known methods such as treating an adhesion-imparting material such as a polyolefin-based resin in advance or disposing an adhesive layer on one side of the film and treating the base fabric can be used. As the thermoplastic resin for the adhesive layer, for example, homopolymer or copolymer of a polyamide resin, a polyolefin resin, or a polyurethane resin, copolymer with other materials, and modified product thereof, and the like having a melting point of 200° C. or less are preferable.

In addition, the lamination processing method is also not particularly limited, known methods such as a dry lamination method in which an adhesive is coated on a base fabric or a film and dried to evaporate a solvent, and then thermocompression bonding is performed, a wet lamination method in which a water-soluble adhesive is applied and pasted and then dried, an extrusion lamination method in which a molten resin is laminated on a base fabric by extrusion, and a thermal lamination method in which a resin layer formed into a film shape is prepared in advance and laminated and thermocompression-bonded can be used. However, from the viewpoint of processing cost and environmental aspect, the thermal lamination method is preferable.

The thickness of the laminate covering material is also not particularly limited, but may be appropriately set between 10 μm and 100 μm according to the purpose. Generally, a curtain bag not assuming the rollover of the automobile is preferably 10 μm to 40 μm, and a curtain bag of a hollow weave assuming occupant protection when the vehicle rolls over is 40 μm to 100 μm.

In the case of hollow weave, warp and weft are usually woven by using sized yarn, and in order to remove the oil agent, sizing agent and the like adhering to the yarn prior to coating such that the adhesiveness between the coating agent or the laminate material and the base fabric is not hindered, scouring is preferably performed by a continuous refiner having a jigger refining machine or a plurality of scouring tanks. After the scouring, the base fabric is dried by a cylinder dryer or the like. After the drying, it may be subjected to the next coating step or laminating step as it is, but it is preferable to subsequently heat-set after scouring and drying in order to adjust the size and the weaving density.

After coating or lamination processing, it is cut into a predetermined size and shape by a laser cutter, accessories such as straps for fixing the airbag are sewn, and attachment parts to the car body, or the like are reinforced, thereby making products.

The specification, shape, and capacity of the airbag of the present invention may be selected according to the location, application, storage space, occupant impact absorption performance, inflator output, or the like.

In addition, in order to suppress the protrusion of the airbag to the occupant side and control the thickness of the airbag in the inflated state, a hanging string or a gas flow adjusting cloth inside the airbag, a belt cloth, or a cloth called a flap on the outside of the airbag may be provided.

In the hollow weave used in the present invention, the structure of the bonded section near the boundary with the inflating section is not particularly limited. For example, it is possible to combine oblique weave, wind weave, plain weave, and the like and perform appropriate repetition thereof.

In addition, depending on the characteristics of the inflator to be used, a heat-resistant protective cloth for protection from hot gas or a mechanical reinforcing cloth may be provided around the inflator ejection port. For these protective cloths and reinforcing cloths, heat-resistant fiber materials such as wholly aromatic polyamide fibers, wholly aromatic polyester fibers, PBO fibers, polyimide fibers, fluorine-containing fibers and the like may be used as the cloth itself, and the base fabric manufactured separately using base fabric that are the same as or thicker than the base fabric for the airbag body may be used. In addition, the base fabric applied with the heat resistant coating agent may be used.

Also the folding of the airbag when storing the airbag may use right/left and up/down symmetrical screen folding from the center like a driver's seat bag, folding to compress from multiple directions toward the center, roll folding like a passenger airbag, bellows folding, screen-like folding, combinations thereof, alligator folding like sheet-built-in type side bag, rolling folding such as a side curtain airbag, roll folding, belt folding, or the like.

The bag body of the present invention can be applied to many uses such as various occupant protection bags, for example, side collision and side curtain airbags for front collision and side collision of driver's and passenger's seats, headrest bag for rear seat protection and rear-end protection, knee bag and foot bag for leg and foot protection, mini bag for infant protection (child seat), bag body for air belt, passenger cars such as pedestrian protection, commercial vehicle, bus, and in addition to each application such as a motorcycle, if it is functionally satisfactory, may be applied to ship, train, airplane, and amusement park facilities.

EXAMPLE

Hereinafter, the present invention will be described more specifically based on examples.

The evaluation of the examples and the comparative examples was performed by computer simulation (ESI PAM-Crush) so as to make it easy to understand the inside of the bag body. The physical properties of the airbag base fabric and the restriction yarn used in the simulation model are based on physical properties obtained from actual airbags and restriction yarns.

Figure 6:
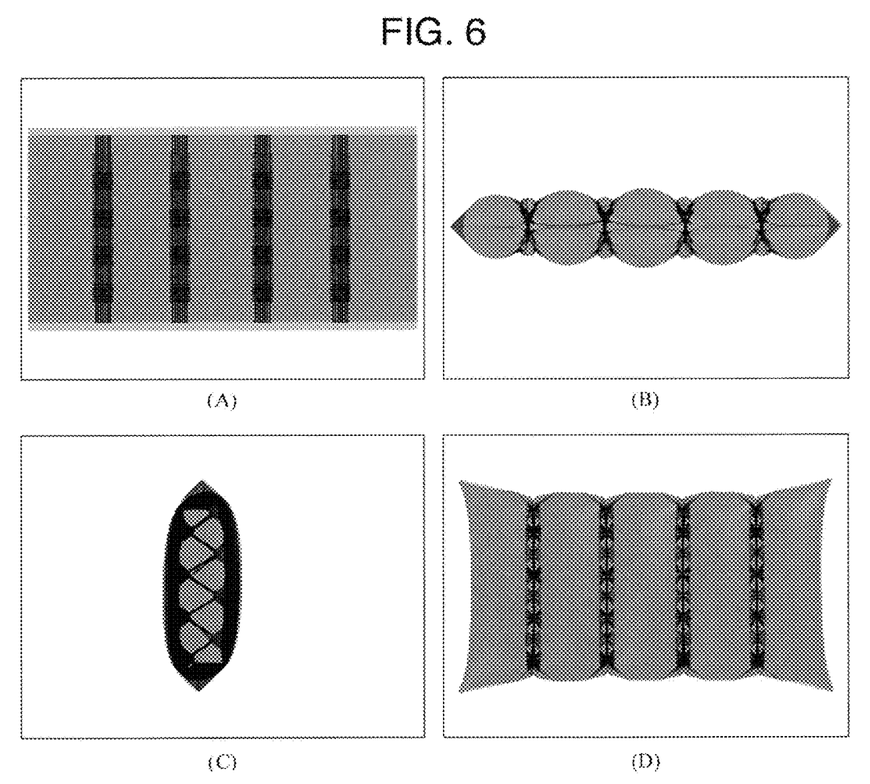
FIG. 6 illustrates a bag body used as Example 1 of the present invention. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

FIG. 6 illustrates the form of the bag body of Example 1 of the present invention.

In Example 1 illustrated in FIG. 6, 4 sets of restriction yarn groups constituted by four yarn units including a first yarn and a second yarn and four yarn units including a first yarn and a third yarn are provided.

Figure 7:
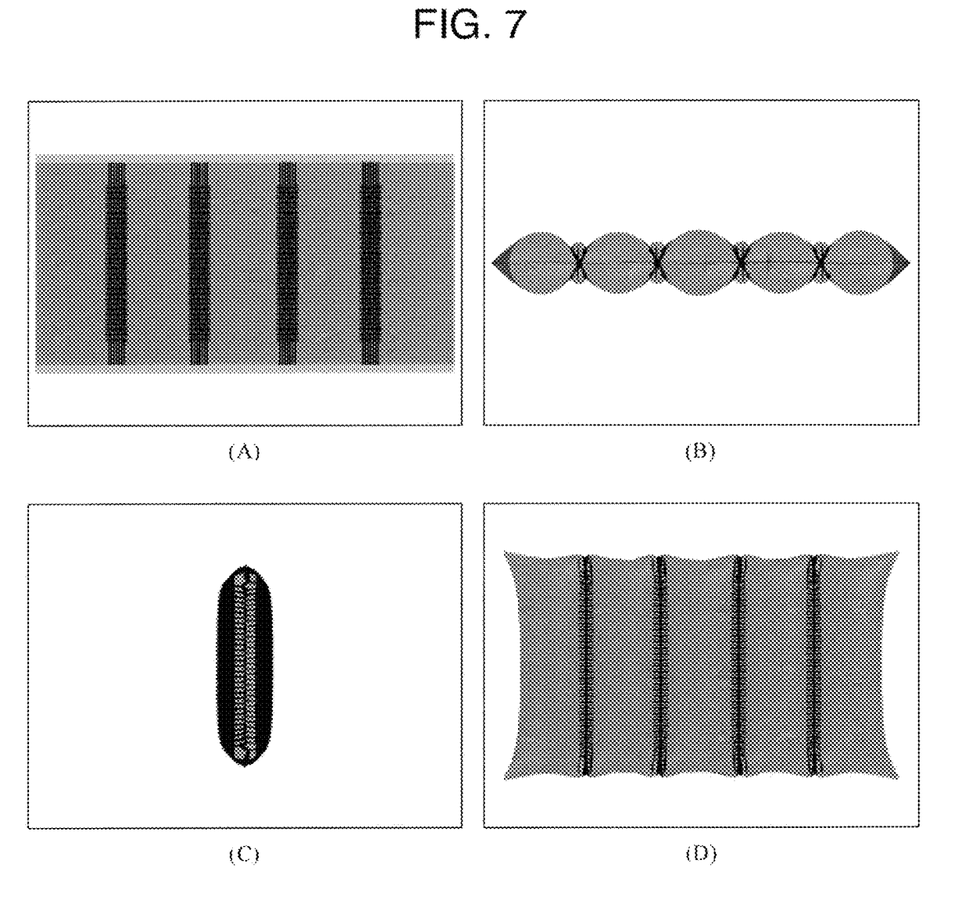
FIG. 7 illustrates a bag body used as Comparative Example 1 of the present invention. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

In Comparative Example 1 illustrated in FIG. 7, the second yarn and the third yarn are alternately arranged without being consecutive.

In Example 1 and Comparative Example 2, the lengths of the restriction yarns constituting the base fabric are all 40 mm.

Figure 8:
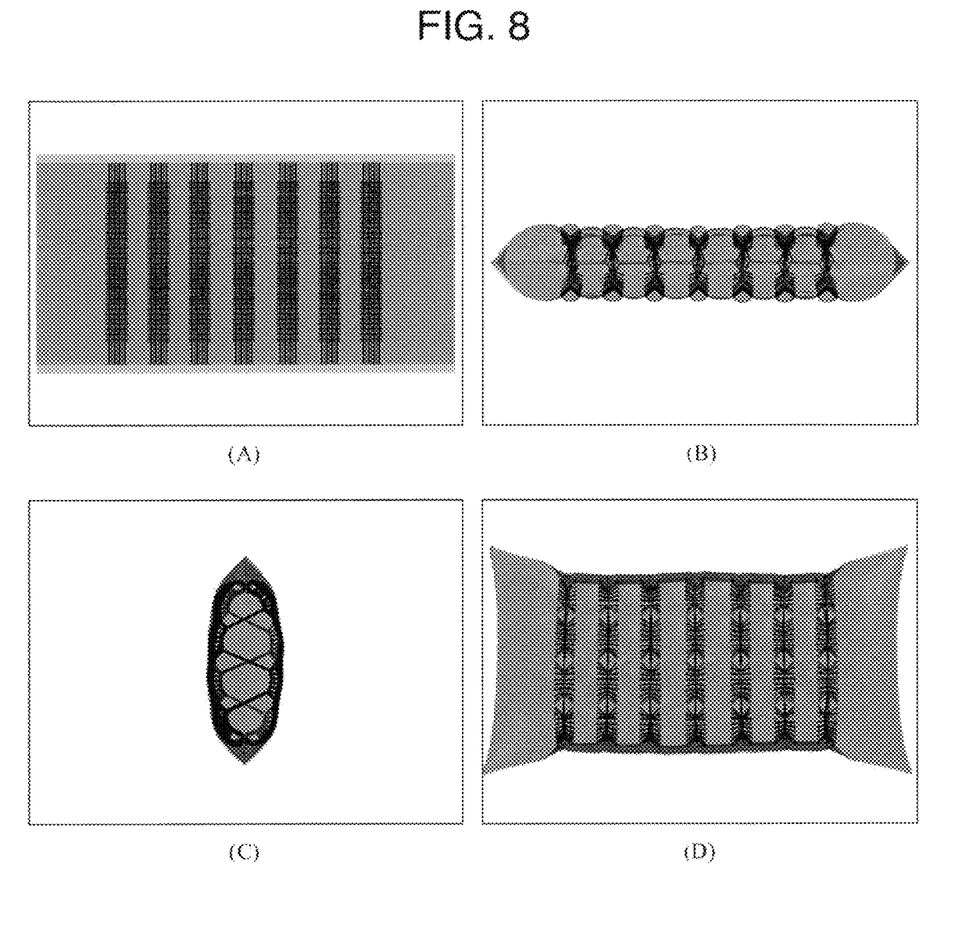
FIG. 8 illustrates a bag body used as Example 2 of the present invention. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

Next, the form of the bag body used as Example 2 is illustrated in FIG. 8.

In Example 2 illustrated in FIG. 8, seven sets of the restriction yarn groups constituted by two yarn units constituted by a first yarn and a second yarn and two yarn units constituted by a first yarn and a third yarn and seven sets of the restriction yarn groups constituted by two yarn units constituted by a fourth yarn and a fifth yarn and two yarn units constituted by a fourth yarn and a sixth yarn are provided.

Figure 9:
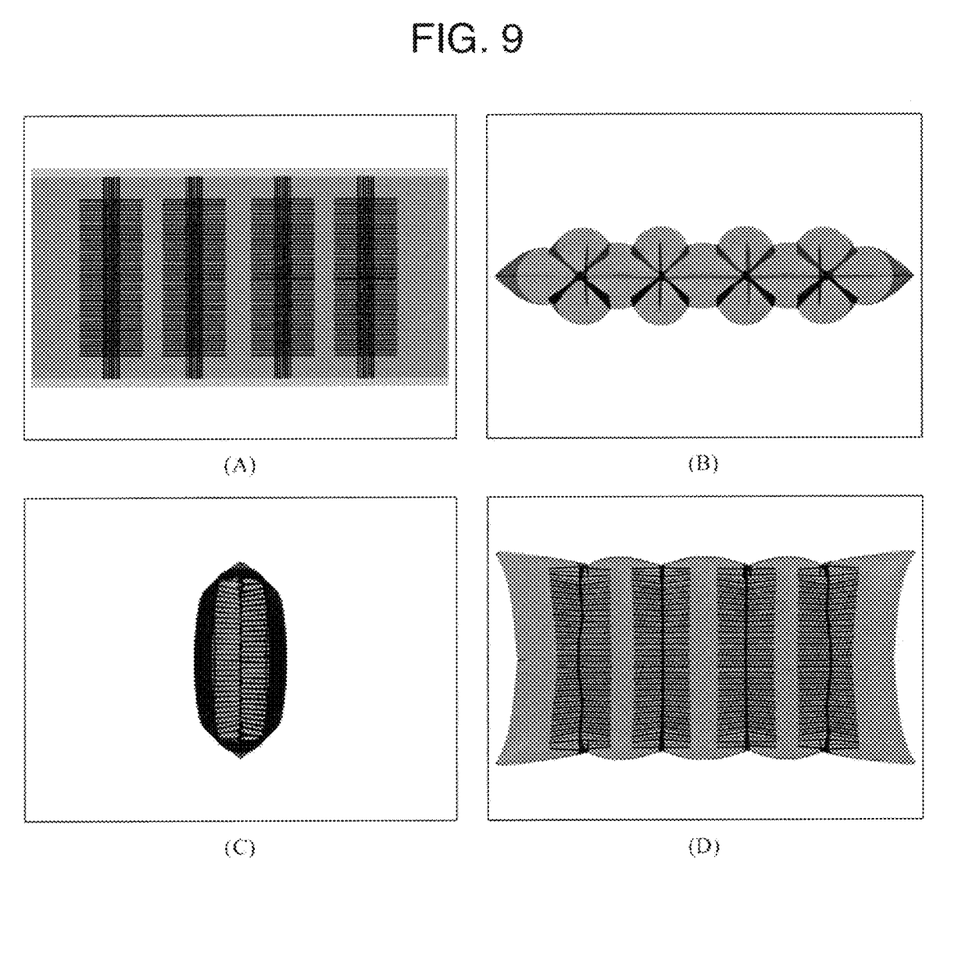
FIG. 9 illustrates a bag body used as Comparative Example 2 of the present invention. (A) illustrates a state of a bag body and a restriction yarn before inflation. (B) illustrates a state when viewed from the bottom in an inflated state of a bag body. (C) illustrates a state when viewed from the side in an inflated state of a bag body. (D) illustrates a state when viewed from the front in an inflated state of a bag body.

In Comparative Example 2 illustrated in FIG. 9, the second yarn and the third yarn are alternately arranged without being consecutively arranged, and the length of the restriction yarn constituting the base fabric was set to 120 mm.

Assuming that the maximum thickness of the bag body at the center of the bag body when inflated at 30 kPa at the bag body is Tmax and the thickness of the end section of the tether is Tmin, the flatness rate is $\varepsilon = Tmin/Tmax$, and the flatness of the bag body was evaluated in the inflated state.

The results are shown in Table 1.

As can be seen from Table 1, the flatness rate is 0.64 in the first embodiment, and the flatness rate was 0.37 in Comparative Example 1 having the same restriction yarn length of 40 mm. Even with the same tether length, the bag body of the present invention is superior in flatness rate.

In addition, in order to increase the thickness of the inflated state, even when comparing Example 2 in which the number of yarn units is reduced in the present invention and Comparative Example 2 in which the second yarn and the third yarn were arranged alternately without being consecutive but the length of the restriction yarn was 120 mm, the flatness rate of Example 2 was 0.85, and the flatness rate of Comparative Example 2 was 0.61. Even in the thick bag body, the effect of raising the flatness rate was recognized by using the present invention. As apparent from FIG. 8, when the present invention is used, the inflation thickness can be increased even if the length of the restriction yarn constituting the base fabric is short. Therefore, it is possible to further increase the number of the restriction yarn groups. It was shown that the flatness rate can be increased even in the bag body having a large inflation thickness.

TABLE 1

| | Example 1 | Comparative Example 1 | Example 2 | Comparative Example 2 |
|---|---|---|---|---|
| Maximum Thickness Tmax (mm) | 144 | 105 | 134 | 172 |
| Thickness of End Section of Tether Tmin (mm) | 92 | 39 | 114 | 106 |
| Flatness Rate ε | 0.64 | 0.37 | 0.85 | 0.61 |

REFERENCE SIGNS LIST 11 first yarn
12 second yarn
13 third yarn
21 first restriction yarn group
22 first yarn unit
23 second yarn unit
31 first yarn
32 second yarn
33 third yarn
34 fourth yarn
35 fifth yarn
36 sixth yarn
41 second restriction yarn group

The invention claimed is:

1. A bag body having therein restriction yarns for restricting inflation, wherein the restriction yarns comprises:
   a first yarn (11, 31) extending across inside the bag body from a non-inflating section to another non-inflating section as a floating yarn;
   a second yarn (12, 32) forming a base fabric on one side of an inflating section of the bag body, the second yarn (12, 32) leaving the base fabric on the one side, being caught on the first yarn (11, 31) or constituting a weaving structure with the first yarn (11, 31), and returning to the base fabric on the one side and being woven into the base fabric; and
   a third yarn (13, 33) forming the base fabric on the other side of the inflating section of the bag body, the third yarn (13, 33) leaving the base fabric on the other side, being caught on the first yarn (11, 31) or constituting a weaving structure with the first yarn (11, 31), and returning to the base fabric on the other side and being woven into the base fabric, wherein a first restriction yarn group (21) is constituted by the first yarn (11, 31), the second yarn (12, 32), and the third yarn (13, 33), the first restriction yarn group (21) comprises a first yarn unit (22) that is configured such that two or more second yarns (12, 32) alone are consecutively caught on the first yarn (11, 31) or constitute a weaving structure with the first yarn (11, 31), and a second yarn unit (23) that is configured such that two or more third yarns (13, 33) alone are consecutively caught on the first yarn (11, 31) or constitute a weaving structure with the first yarn (11, 31), and the first yarn unit (22) and the second yarn unit (23) are arranged alternately in an extending direction of the first yarn (11, 31), and when the bag body inflates, the first yarn (11, 31) would be pulled by each of the second yarn (12, 32) and the third yarn (13, 33), thereby forming a wavy line shape within the bag body.

2. The bag body according to claim 1, wherein the lengths of the second yarn and the third yarn constituting each yarn unit are different according to each yarn unit.

3. The bag body according to claim 1, wherein in the lengths of the second yarn and the third yarn constituting each yarn unit, the length of the yarn arranged on the outside in each of the yarn units with respect to the extending direction of the first yarn is longer than the length of the yarn arranged on the inside.

4. The bag body according to claim 1, wherein a plurality of first restriction yarn groups are arranged side by side.

5. The bag body according to claim 1,
wherein the restriction yarns further comprises:
a fourth yarn (34) extending across inside the bag body from the non-inflating section to another non-inflating section as a floating yarn and extending parallel to the first yarn (31);
a fifth yarn (35) forming the base fabric on the other side of the inflating section of the bag body, the fifth yarn (35) leaving the base fabric on the other side while being opposite to the second yarn (32), being caught on the fourth yarn (34) or constituting a weaving structure with the fourth yarn (34), and returning to the base fabric on the other side and being woven into the base fabric; and
a sixth yarn (36) forming the base fabric on one side of the inflating section of the bag body, the sixth yarn (36) leaving the base fabric on the one side while being opposite to the third yarn (33), being caught on the fourth yarn (34) or constituting a weaving structure with the fourth yarn (34), and returning to the base fabric on the one side and being woven into the base fabric, a second restriction yarn group (41) is constituted by the fourth yarn (34), the fifth yarn (35), and the sixth yarn (36), the second restriction yarn group (41) comprises a third yarn unit that is configured such that two or more fifth yarns (35) alone are consecutively caught on the fourth yarn (34) or constitute a weaving structure with the fourth yarn (34), and a fourth yarn unit that is configured such that two or more sixth yarns (36) alone are consecutively caught on the fourth yarn (34) or constitute a weaving structure with the fourth yarn (34), and the third yarn unit and the fourth yarn unit are arranged alternately in an extending direction of the fourth yarn (34), and when the bag body inflates, the fourth yarn (34) would be pulled by each of the fifth yarn (35) and the sixth yarn (36), thereby forming a wavy line shape within the bag body.

6. The bag body according to claim 5, wherein the lengths of the fifth yarn and the sixth yarn constituting each yarn unit are different according to each yarn unit.

7. The bag body according to claim 5, wherein in the lengths of the fifth yarn and the sixth yarn constituting each yarn unit, the length of the yarn arranged on the outside in each of the yarn units with respect to the extending direction of the fourth yarn is longer than the length of the yarn arranged on the inside.

8. The bag body according to claim 5, wherein a plurality of second restriction yarn groups are arranged side by side.

* * * * *